(12) United States Patent
Markham et al.

(10) Patent No.: US 6,412,938 B1
(45) Date of Patent: Jul. 2, 2002

(54) SYSTEM AND METHOD FOR REDUCING INTER-COLOR BLEEDING IN LIQUID INK JET PRINTING

(75) Inventors: Roger Guy Markham; Yonglin Xie; William G. Hawkins, all of Webster, NY (US)

(73) Assignee: Xerox Corporation, Stamford, CT (US)

( * ) Notice: Subject to any disclaimer, the term of this patent is extended or adjusted under 35 U.S.C. 154(b) by 39 days.

(21) Appl. No.: 09/594,689

(22) Filed: Jun. 16, 2000

(51) Int. Cl.⁷ .............................................. G01D 11/00
(52) U.S. Cl. ............... 347/100; 400/124.11; 400/124.1; 400/124.09
(58) Field of Search ............................ 347/100, 20, 21, 347/24, 5, 40, 44, 101, 104; 400/124.09, 124.11, 124.1

(56) References Cited

U.S. PATENT DOCUMENTS

| 5,422,666 A | 6/1995 | Koyama |
| 5,654,744 A | 8/1997 | Nicoloff, Jr. et al. |
| 5,870,112 A | 2/1999 | Kang et al. |
| 6,244,687 B1 * | 6/2001 | Gast et al. ..................... 347/43 |
| 6,273,549 B1 * | 8/2001 | Wetchler et al. .............. 347/23 |
| 6,296,343 B1 * | 10/2001 | Alfaro .......................... 347/43 |
| 6,299,284 B1 * | 10/2001 | Alfaro .......................... 347/43 |

* cited by examiner

Primary Examiner—Daniel J. Colilla
Assistant Examiner—Darius N. ConeDaniel
(74) Attorney, Agent, or Firm—Oliff & Berridge, PLC

(57) ABSTRACT

Printing systems and methods that reduce inter-color bleeding between dark and light colored inks without losing productivity of a color ink jet printer by distributing the printing of a total amount of black ink required in a single swath over multiple passes while each of the color inks required for the same swath is printed in a single pass. For example, the print method may print a single swath by printing portions of the slow dry black ink in three passes while printing each of the fast dry color inks in single passes.

22 Claims, 3 Drawing Sheets

| SWATH | PASS NUMBER | | | | | | |
|---|---|---|---|---|---|---|---|
| | 1 | 2 | 3 | 4 | 5 | 6 | 7 |
| 1 | Y | MB1 | CB2 | B3 | | | |
| 2 | | Y | MB2 | CB3 | B1 | | |
| 3 | | | Y | MB3 | CB1 | B2 | |
| 4 | | | | Y | MB1 | CB2 | B3 |
| 5 | | | | | Y | MB2 | CB3 |
| 6 | | | | | | Y | MB3 |
| 7 | | | | | | | Y |

SYSTEM AND METHOD FOR REDUCING INTER-COLOR BLEEDING IN LIQUID INK JET PRINTING

BACKGROUND OF THE INVENTION

1. Field of Invention

This invention relates to ink jet printers.

2. Description of Related Art

A thermal ink jet print head selectively ejects droplets of ink from a plurality of drop emitters to create a desired image on an image receiving member, such as a sheet of paper. The print head typically comprises an array of the drop emitters that convey ink to the image receiving member. In a carriage-type ink jet print head, the print head moves back and forth relative to the image receiving member to print the image in swaths. Each swath can be many pixels tall.

An ink jet print head typically comprises a plurality of ink passageways, such as capillary channels. Each channel has a nozzle and is connected to an ink supply manifold. Ink from the manifold is retained within each channel until, in response to an appropriate signal applied to a resistive heating element in each channel, the ink and a portion of the channel adjacent to the heating element is rapidly heated and vaporized. Rapid vaporization of some of the ink in the channel creates a bubble that causes a quantity of ink, i.e., an ink droplet, to be ejected from the emitter to the image receiving member.

The productivity of ink jet color printing has always been an important factor in user satisfaction. The low color productivity is generally a result of the fact that the ink jet print head carries out multi-pass printing to achieve a high level of print quality. Current state of the art ink jet printers offer users a choice of fast color printing or good quality color printing, but both requirements can not be simultaneously achieved. This choice of speed or quality comes from selecting either the DRAFT mode or normal and/or high quality mode. In DRAFT mode, printing is done is a single pass and with less than 100% inking. For example, DRAFT mode printing often employs a 50% checker board mask to reduce ink coverage by ½. As a result, the color images are created quickly, but they do not have saturated, deep color and they also appear very grainy. In the normal or high quality modes, printing is done in multiple passes and with full ink saturation. While the output is delivered more slowly, the quality is very high and often surpasses that achieved by much more expensive printing methods and apparatus.

SUMMARY OF THE INVENTION

This invention allows a scanning carriage type ink jet printer to produce high quality color output while using a bi-directional, single pass printing method. The term "bi-directional" refers to the printing technique where printing takes place while the carriage is scanning in both directions. The term "single pass" means that all of a particular color is deposited on the media with a single pass of the color print head over an area. Such a printing method allows up to 2 times faster color printing from the same number of color jets. Since jet count increase adds to printer cost, this method is a low cost way to achieve high color print speed.

While the current single-pass printing methods produce fast output, the image formed by this technique suffers from significantly reduced print quality. The reduced print quality is a consequence of unsaturated printing. One possible way to increase single pass print quality is to completely saturate the printed color area in one pass. When single pass printing with full saturation is attempted, inter-color bleeding (ICB) between the black and one or more of the color inks on the recording medium makes the output quality of color prints unacceptable. Inter-color bleeding results when one ink, usually the slow drying ink, wicks along paper fibers that have been wetted by another ink. In many more serious situations, the slow dry ink, due to the fact that it sits on the paper's surface, moves significant distances into adjacent color areas. This bleeding image defect is most objectionable when yellow is printed next to black, but is also visible with other colors.

Factors that affect inter-color bleeding include: (1) ink properties such as surface tension of the inks and interactions between the inks; (2) the dry time of the inks, where the shorter the dry time the lower the inter-color bleeding becomes; (3) the time between the two bleeding inks being printed, where the longer the delay the lower the inter-color bleeding becomes; and (4) the amount of ink available to feed the bleeding. In practice, the worst situation for inter-color bleeding combines a slow dry ink, a large drop volume, and a solid area image. Most ink jet printers make use of slow dry or high hold out formulations for the black ink and fast drying or fast absorbing formulations for the color inks. These black and color ink choices are made because it is not possible to get the required level of black area darkness and edge sharpness with fast dry inks on a range of plain papers. Dark, sharp black printing is required for ink jet to achieve laser quality black printing.

The most common prior art ink jet print head configuration for color printing is for the three or more color jet arrays to be arranged in parallel rows. The color sections are typically cyan, magenta and yellow. With this configuration, strokes of different colors are printed in the same print swath. This color print head configuration will be called "same swath color print heads" to differentiate this prior art color print head configuration from the configuration employed in the present invention.

A second black print head has a jet array that is about 3 or more times the length of the color array. The print heads are mounted on the scanning carriage of the printer to place the color arrays vertically (perpendicular to the scan direction) so that they terminate in the same place as one end of the black array. The common black and color array vertical termination point is at the end of the array where printing first takes place. In this configuration, the full stroke of color and black arrays would appear on the media as parallel strokes with the black extending 2 to 3 times further than the color strokes. This color and black print head configuration is typical of products such as the HP 800 series and 900 series ink jet printers.

An alternative configuration is for the color arrays within a tri-color print head to be arranged in a line so that they form a parallel array next to the black array. In the case of parallel arrays, the length of the combined color arrays is typically shorter than the black array.

In the present invention, the color arrays are arranged sequentially rather than in parallel so that each of their strokes would appear in a subsequent print swath. In addition, the black print head is offset from one color section of the tri-color print head, so that one-third of the black print head is behind the tricolor print head in the direction of travel of the recording medium.

Prior art ink jet printers carry out high quality color printing by printing all of the color first in two or more passes and then printing all of the black in one pass with the last section of the black print head. This printing method achieves the longest delay between color and black printing. In order for this printing method to produce acceptable print quality, and even with the long delay that is achieved with this configuration, special additives must be included in the color ink formulation in order for bleeding to be reduced to an acceptable level. These additives are typically precipitating agents that are added to the color inks. The precipitating agents precipitate the black colorant as it moves toward the color sections.

The use of tri-color print heads that have all colors printing in one swath has the further problem that the order of color printing is reversed for right to left with respect to left to right printing. The color print order reversal with scan direction change leads to color tone changes when secondary colors are printed. Therefore, for same swath tri-color print heads, a second problem of color banding also produces single pass color print quality defects.

Since the black ink is a slow drying ink, the color inks are printed first. In one configuration, the yellow ink is printed three swaths ahead of the black ink. The magenta ink is printed two swaths ahead of the black ink. The cyan ink is printed one swath ahead of the black ink. The yellow section is located the furthest from the black to allow more time for the yellow ink to dry because the black to yellow inter-color bleeding is most visible.

Unfortunately, this approach still gives a very poor inter-color bleeding print quality. This technique also results in a non-uniform usage of the black print head because the offset one-third of the black print head that is not aligned with the color print head will be used much more than the remaining two-thirds of the black print head. Over long term use, this will result in reduced print head lifetime and eventually banding effects in the printed image.

This invention utilizes a unique color and black drop ejector array configuration in conjunction with a specific color printing order and black ink lay down method.

Accordingly, this invention provides ink jet printer systems and methods that reduce inter-color bleeding.

This invention separately provides ink jet printing systems and methods that reduce inter-color bleeding without substantially affecting productivity.

In various exemplary embodiments, a printing systems and methods reduce an amount of inter-color bleeding between the black ink and one or more of the color inks by distributing the printing of a total amount of the black ink required in a single swath over multiple passes while, each of the color inks required for the same swath may be printed in a single pass. For example, in various exemplary embodiments, the printing systems and methods may print a single swath by printing portions of the slow dry black ink in three passes while printing each of the fast dry color inks in single passes.

While many of the examples for using this invention are made with reference to thermal inkjet drop ejection methods here, this invention is broadly applicable to any method for printing with liquid ink drops. Examples of other methods include continuous ink jet, piezo-electric inkjet and MEM's based ink jet. All of these liquid printing methods are within the scope of this invention.

BRIEF DESCRIPTION OF THE DRAWINGS

The invention will be described with reference to the following drawings in which like reference numerals refer to like elements, and wherein.

DETAILED DESCRIPTION OF PREFERRED EMBODIMENTS

Figure 1:
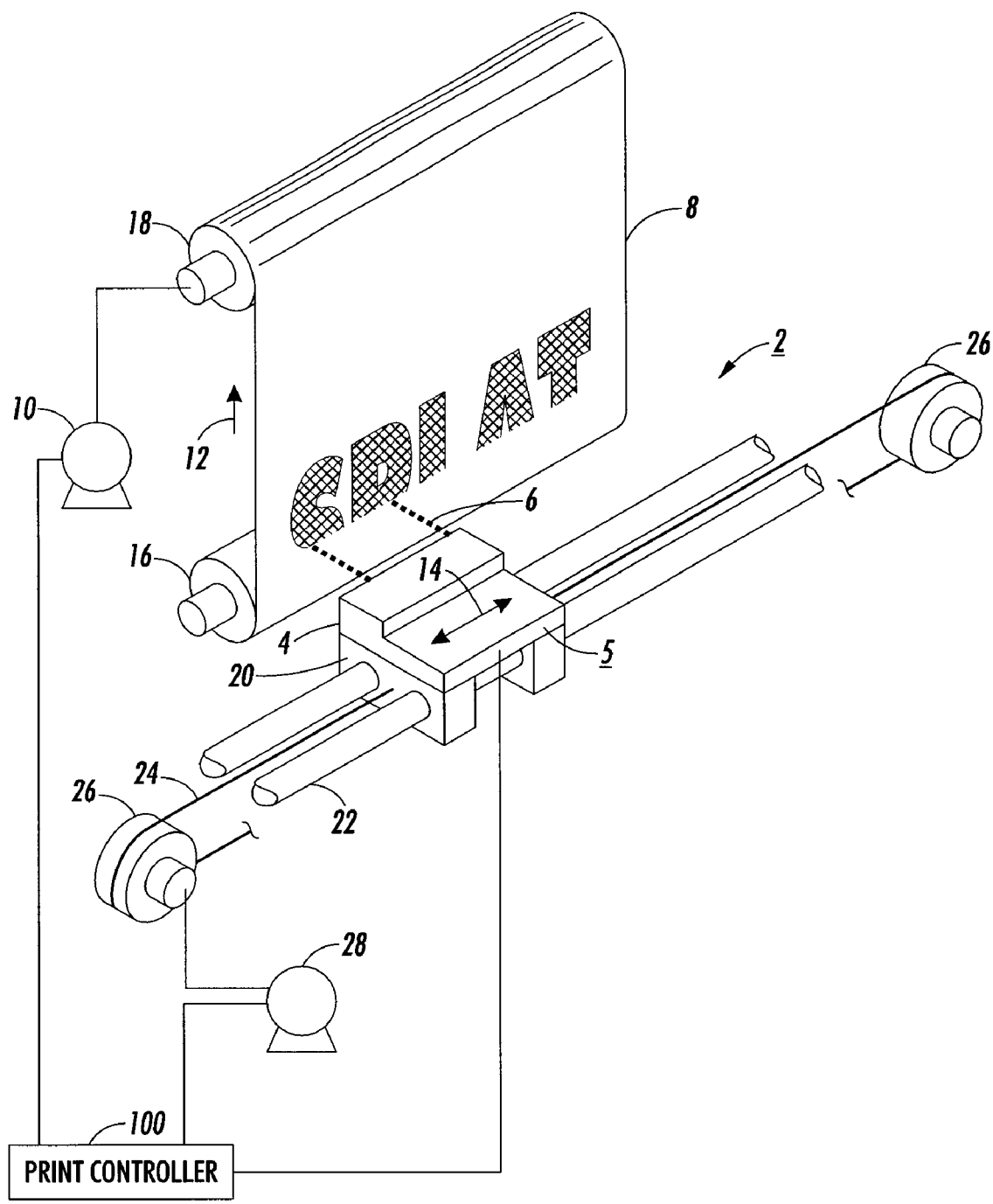
FIG. 1 is a schematic view of a printing system usable with the ink jet printing systems and methods according to this invention.

FIG. 1 shows an exemplary carriage-type ink jet printing device 2. A vertically-managed linear array of droplet-producing channels is housed in a print head 4 mounted on a reciprocal carriage assembly 5. In FIG. 1, print head 4 is understood to mean the combination of color and black print heads together with their specific relationship, as discussed in FIG. 2. Ink droplets 6 are propelled to a recording medium 8, such as a sheet of paper, that is stepped by a motor 10 a preselected distance (often equal to the size of the array) in a printing direction, as indicated by arrow 12, each time the print head 4 traverses across the recording medium 8 in one of the directions indicated by arrow 14. The recording medium 8 can be stored on a supply roll 16 and stepped onto takeup roll 18 by stepper motor 10 or stored in other structures, apparatuses or devices well known to those of skill in the art.

The print head 4 is fixedly mounted on a support base 20, which is adapted for reciprocal movement using any well known structure, apparatus or device, such as two parallel guide rails 22. A cable 24 and a pair of pulleys 26 can be used to reciprocally move the print head 4. One of the pulleys 26 can be powered by a reversible motor 28. The print head 4 is generally moved across the recording medium 8 perpendicularly to the direction the receiving member 8 is moved by the motor 10. Of course, other structures for reciprocating the carriage assembly 5 are possible.

The ink jet printing device 2 is operated under the control of a print controller 100. The print controller 100 transmits commands to the motors 10 and 28 and to the print head 5 to produce an image on the image recording medium 8. Furthermore, the print head controller 100 can control the ejection of inks from the print head 4.

Figure 2:
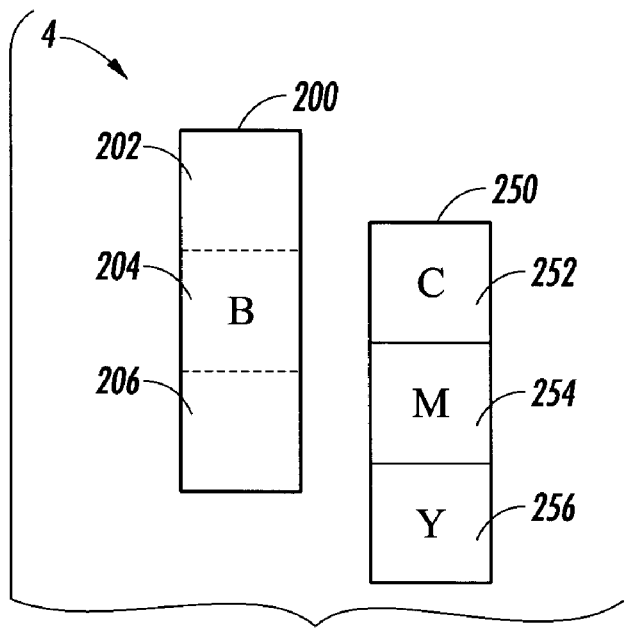
FIG. 2 is a schematic diagram of a print head usable with the ink jet printing systems and methods according to this invention.

FIG. 2 shows an exemplary structure of a print head 4 including a black print head 200 and a color print head 250. The color print head 250 can be divided into different color sections 252, 254 and 256. For example, as shown in FIG. 2, the color print head 250 is a tri-color print head that is divided into a cyan color section 252, a magenta color section 254 and a yellow color section 256. It should be understood that the color print head 250 can be divided into any number of color sections without departing from the spirit and scope of the this invention.

The black print head 200 ejects only black ink from its nozzles. While the distribution of ejection nozzles on the black print head is uniform, for the purposes of this discussion, the black print head 200 can be thought of as being divided into sections first-third 202, 204 and 206 that generally correspond to the color sections 252, 254 and 256. The black print head can also be positioned in an offset position relative to the color print head 250.

As shown in FIG. 2, the black print head 200 is positioned in an offset position relative to the color print head 250 so that a third, or offset, section 202 of the black print head 200 is offset behind the portions 252–256 of the color print head 250 in the printing direction 12. Furthermore, the second-section 204 is aligned with the cyan portion 252 of color print head and the first section 206 is aligned with the magenta section 254 of the color print head 250. The yellow section 256 of the color print head 250 is positioned ahead of the black print head 200, and therefore is offset ahead of all of the first-third portions 202–206 of the black print head 200 in the printing direction 12.

In operation, as the print head 4 travels across the recording medium 8, the print head 4 creates a swath of ink on the recording medium 8 by ejecting ink onto the recording medium. Each swath of the print head 4 is generally as tall as a color section 252, 254 and 256. In various exemplary embodiments, the swaths of the print head 4 are 104 pixels high. In the exemplary embodiment shown in FIG. 2, in order for the print head 4 to completely print one swath, the print head passes over each of the swaths of the image at least four times.

For example, in a first pass, only the yellow section 256 of the print head 4 passes over the "current" swath. Therefore, the print head 4 only ejects yellow ink to the "current" swath of the recording medium 8 during the first pass. In a second pass, the black section 206 and the magenta section 254 of print head 4 pass over the "current" swath. Accordingly, this time the print head 4 ejects both the magenta ink and a first portion of the black ink to the "current" swath of the recording medium 8. In a third pass, the black section 204 and the cyan section 252 of the print head 4 pass over the "current" swath. Accordingly, the print head 4 ejects both the magenta ink and a second portion of the black ink to the "current" swath of the recording medium 8. In a fourth pass, only the black section 202 passes over the "current" swath. Accordingly, the print head 4 ejects only a final portion of the black ink to the "current" swath of the recording medium 8.

By using this configuration, the "current" swath is traversed by each of the cyan, magenta and yellow color sections 252, 254 and 256 only once. Therefore, as each of the color sections 252, 254 and 256 pass over a swath, the corresponding color section must eject all of that color ink during that pass necessary to properly form the corresponding portion of the image.

Similarly, each section of the black print head 202, 204 and 206 passes over each swath of the recording medium 8 only once. However, because all the sections 202, 204 and 206 eject only black ink, each section 202–206 only needs to eject a portion of the total required black ink for each swath. Accordingly, each of the black print head sections 202, 204 and 206 need only transfer a portion of the black ink, such as one-third, in order to eject the total amount of black ink required to complete the swath. By doing so, inter-color bleeding can be reduced since the time between printing the color ink and the total black ink has been increased.

For example, referring to FIG. 2 for a single pass color mode, as the print head 4 travels over a "current" swath, first the yellow ink is ejected by the yellow section 256 of the color print head 250. As described above, since this is the only time the yellow section 256 passes over this "current" swath, the yellow section 256 must eject all of the necessary yellow ink. Yellow ink is generally chosen to be ejected first because it is one of the inks most prone to inter-color bleeding with the black ink.

During the second pass, the color print head section 254 ejects magenta ink and the black print head section 206 ejects a first portion of the black ink over the yellow ink that was already ejected onto the "current" swath. At the same time, the yellow print head section 256 is driven to print a "next" swath. As described above, in order to decrease inter-color bleeding, the first portion of the black ink need only be one-third of the total amount of black ink to be ejected on to the "current" swath. Therefore, the inter-color bleeding between the yellow and black ink is reduced because the yellow ink has had time to dry prior to exposure to the first portion of the black ink. Additionally, the inter-color bleeding is also reduced because the recording medium 8 is not overwhelmed with all of the necessary black ink at one time. Furthermore, the inter-color bleeding between the magenta and black is reduced because only a portion of the black ink is simultaneously ejected with the magenta ink. As described above, reducing the amount of ink ejected on to the recording medium 8 results in a decrease in the amount of inter-color bleeding.

During the third pass over the "current" swath, the color print head section 252 ejects cyan ink and the black print head section 204 ejects a second portion of the black ink over the yellow ink, magenta ink and first portion of the black ink already present in the "current" swath. At the same time, the magenta section 254 and the third section 206 are driven to eject onto the "next" swath, while the yellow section 256 is driven to eject onto a "subsequent" swath.

Again, the second portion of the black ink can also be approximately one-third of the total amount of the black ink to be ejected onto the "current" swath. Therefore, the inter-color bleeding between the yellow and black is again reduced because the yellow ink has had additional time to dry prior to exposure to the second portion of the black ink. Furthermore, the inter-color bleeding between the magenta and the second portion of black ink is reduced because the magenta ink has also had time to dry. The inter-color bleeding between the cyan and one-third of the black ink ejected from the second section 204 is reduced because only a portion of the black ink is ejected with the cyan ink. Again, as described above, a reduction in the amount of ink ejected at any one time results in less inter-color bleeding.

During the fourth and final pass for the "current" swath, only the first black print head section 202 passes over the "current" swath. Accordingly, the black print head section 202 can eject the final approximate one-third of the black ink onto the "current" swath. At the same time, the cyan section 257 and the second portion 204 are driven to eject onto the "next" swath, while the magenta section 254 and the third portion 256 are driven to eject onto the "subsequent" swath and the yellow section 256 is driven to eject onto a "further" swath. Once the final pass for the "current" swath is complete, the "current" swath portion of the image is complete and the amount of inter-color bleeding between the colors in the "current" swath has been reduced.

It should be understood that, the above discussion is a simplification of common practice in that, commonly, there are non-printing sections between the three printing sections of the color head. The practical effect of this is to produce small bands that have additional delays between applications of the various inks or portions thereof.

It should be understood that, while the portions of the amount of black ink ejected by each section 202, 204 and 206 of the black print head 200 have been described for convenience as approximately being thirds, any combination of fractions may also be used without departing from the spirit and scope of the present invention. For example, the portions may be divided as 37.5%, 31.25% and 31.25% between the first, second and third portion amounts, respectively.

Figure 3:
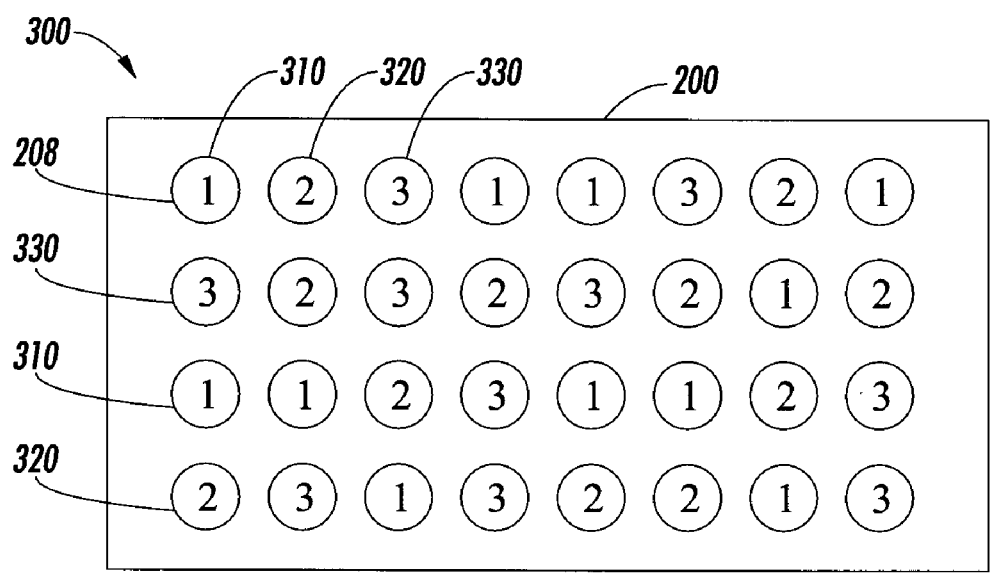
FIG. 3 is a schematic diagram of a pattern or mask for a black print head to reduce inter-color bleeding according to this invention.

FIG. 3 shows an exemplary pattern or mask 300 usable to control which nozzles eject different portions of the black ink from the black print head 200. The mask 300 may be repeated as necessary to include the total numbers of black ejection nozzles included in the black print head 200. For example, if the black print head 312 active pixels high, the mask could be repeated in the vertical direction 78 times to cover the entire black print head 200.

Figures 4, 5:
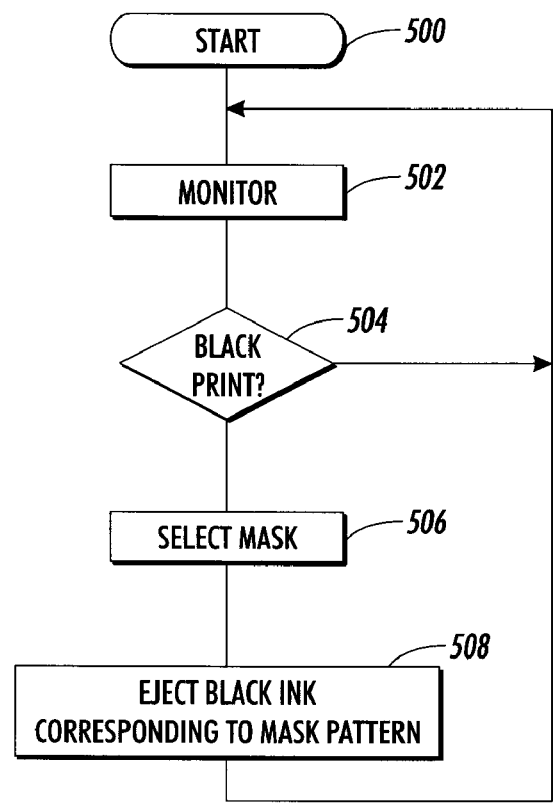
FIG. 4 is a table outlining a printing order of the print head shown in FIG. 2 usable with the ink jet printing systems and methods according to the invention.
FIG. 5 is a flowchart outlining one exemplary embodiment of a process for reducing inter-color bleeding in an ink jet printer in accordance with this invention.

FIG. 4 shows a chart that describes the operation of the tri-color print head 250 and the black print head 200 when used with the mask 300. The first column of the chart indicates the number of the swath of the image being printed. For example, swath number 1 is the first swath of the image, while swath number 4 is the fourth swath of the image. For simplicity of the discussion, only seven swaths have been shown in FIG. 4, however, it should be understood that a typical image can include any number of swaths.

The remainder of the columns, columns 2–8, represent the number of the pass being made by the print head 4. For example, column 2 represent the first pass made by the print head, while column number 4 represents the third pass made by the print head 4. Again, for the simplicity of discussion, only 7 passes are shown. However, it should be understood that a typical image can require any number of passes to create.

Furthermore, for the purposes of this discussion, each of the swaths 1–7 are as tall as each of the color sections 252, 254 and 256 of the color print head 250 and also as tall as each of the black print head sections 202, 204 and 206 and there are no non- printing sections between colors.

As the print head 4 passes along swath 1 during pass 1, the yellow color section 256 of the print head is the only portion of the print head 4 that travels over the swath 1. Accordingly, as shown in FIG. 4, for pass 1, only yellow ink is ejected from the color section 256 for the swath 1.

During pass 2, which is usually a return pass, the print head 4 is advanced one swath in the printing direction of the recording medium. Accordingly, the yellow section 256 is now aligned with swath 2, while the magenta color section 254 and third black section 206 are now aligned with swath 1. Furthermore, this is the first pass of any portion of the black print head 200 over the swath 1.

Accordingly, as indicated by the mask 300 shown in FIG. 3 and the table shown in FIG. 4, only a first set 310 of the nozzles 208, i.e., only those nozzles 208 labeled with a "1", are driven to eject ink onto swath 1 during the pass 2. In a manner similar to that described above, the color section 256 will eject yellow ink onto swath 2 during pass 2. As shown in FIG. 4, this is denoted by a "MB1" for the swath 1 corresponding to the pass 2 of the print head, and a "Y" for the swath 2 corresponding to the pass 2 of the print head 4. The symbol "MB1" signifies that both magenta ink and black inks using the first set of nozzles 310, as defined by the mask 3 shown in FIG. 3, were used to eject black ink onto the swath 1.

During a pass 3 of the print head 4, the color section 256 is aligned with swath 3, while the color section 254 and the black section 206 are aligned with swath 2 and the color section 252 and the second black section 204 are aligned with swath 1. Accordingly, as the print head 4 travels across the recording medium 8 for the pass 3, the black print head 200 will make a second pass across the recording medium 8. Accordingly, the black print head 200 will be driven to eject ink only from a second set 320 of the nozzles 208, i.e., the nozzles 208 labeled with a "2" in the mask 300. As a result, as shown in the table of FIG. 4, after the third pass, the swath 1 has been printed using the cyan, magenta and yellow color ink, as well as the first and second portions B1 and B2 of the black ink necessary to fully form the desired image. That is, the swath 1 now contains black ink, B1 and B2, spots ejected from the first and second sets 310 and 320 of the nozzles 208 corresponding to the mask 300. Additionally, the swath number 2 only contains necessary to form the desired image that is, this second portion B2 black ink corresponds to the second set 320 of the nozzles 208 as defined by the mask 300. Finally, the swath 3 contains only yellow ink necessary to form the desired image.

During a pass 4 of the print head 4 across the recording medium 8, the first black section 202 passes over the swath 1, while the cyan section 252 and the second black section 204 passes over the swath 2. Furthermore, the third black section 206 and the magenta section 254 passes over the swath 3 and the yellow section 256 passes over the swath 4. Since this is the third pass of the black print head 200 across the recording medium 8, a third set 330 of the nozzles, according to the mask pattern 300, are driven during pass 4.

Accordingly, the swath 1 is now complete and now contains the yellow (Y), magenta (M) and cyan (C) inks, along with all three portions (B1, B2 and B3) of the black ink necessary to form that swath of the image. The swath 1 contains the yellow (Y), magenta (M) and cyan (C) inks, along with second and third portions B2 and B3 of the black ink corresponding to the mask 300. The swath 3 only contains the yellow (Y) and magenta (M) inks, and the third portion B3 of the black ink corresponding to the mask 300. Finally, the swath 4 contains only yellow ink (Y).

As shown in the table of FIG. 4, this pattern will continue until the image is complete. Furthermore, as shown in FIG. 4, the sequential use of the first, second and third portions B1–B3 of the black ink, as defined by the mask 300, complements itself in each swath, so that each swath receives each of the portions B1, B2 and B3 of the black ink, to provide the total amount of black ink as a result of the passes of the black print head 200.

FIG. 4 also illustrates in passes 3–7, that, after the pass 2, the entire black print head 200 is driven during each pass, with one of the sets 310–330 of the nozzles 208 being enabled over all of the first-third portions 202–206 of the black print head 200.

However, as shown in swaths 1–7 of FIG. 4, while each set 310, 320 or 330 of the nozzles 208 of the black print head 200 are enabled during one of the passes for a particular swath 1–7, the sets 310, 320 and 330 are not necessarily enabled in that order. That is, as illustrated in swaths 2 and 3, the second or third portions 320 or 330 of the nozzles 208, corresponding to the second or third portions B2 and B3 of the black ink required by that swath 2 or 3 to form the desired image, may be the first portion of the nozzles 208 to be enabled for a particular swath.

It should also be understood that various other embodiments of this invention can be implemented by varying the number of sections of the color print head 250 and the black print head 200 and by introducing non-printing sections between the printing sections of the heads. Furthermore, fewer(more) jets of the black print head may be used together with fewer(more) passes (e.g., twice as many black jets as color jets with half of the black pixels printed in each pass). Additionally, the color can be printed in multiple passes (with reduced paper advance) while printing the black in proportionately more passes. Also, the black can be printed on a subset of the passes such as to print the black uni-directionally while the color is printed bi-directionally. Table 1 describes a partial listing of such alternative exemplary embodiments of the invention.

TABLE 1

|  | COLOR | BLACK | Black Jets/ Color Jets |
|---|---|---|---|
| Embodiment 1 | 1-pass bi-directional | 2-pass bi-directional | 2 |
| Embodiment 2 | 2-pass bi-directional | 4-pass bi-directional | 2 |
| Embodiment 3 | 4-pass bi-directional | 8-pass bi-directional | 2 |
| Embodiment 4 | 2-pass bi-directional | 2-pass uni-directional | 2 |
| Embodiment 5 | 4-pass bi-directional | 4-pass uni-directional | 2 |
| Embodiment 6 | 1-pass bi-directional | 3-pass bi-directional | 3 |
| Embodiment 7 | 2-pass bi-directional | 6-pass bi-directional | 3 |
| Embodiment 8 | 4-pass bi-directional | 12-pass bi-directional | 3 |
| Embodiment 9 | 2-pass bi-directional | 3-pass uni-directional | 3 |
| Embodiment 10 | 4-pass bi-directional | 6-pass uni-directional | 3 |
| Embodiment 11 | 1-pass bi-directional | 4-pass bi-directional | 4 |
| Embodiment 12 | 2-pass bi-directional | 8-pass bi-directional | 4 |
| Embodiment 13 | 4-pass bi-directional | 16-pass bi-directional | 4 |
| Embodiment 14 | 2-pass bi-directional | 4-pass uni-directional | 4 |
| Embodiment 15 | 4-pass bi-directional | 8-pass uni-directional | 4 |

Usually, higher numbers of passes correspond to a printing mode that is slower but produces higher print quality. If the total number of black nozzles is approximately twice as many as the number of nozzles in each color section, embodiments 1–5 are most appropriate because it minimizes the number of nearest neighbor pixels being printed in each black pass. For example, in embodiments 1–5, twice as many black jets are needed as single color jets. The fraction of black pixels printed on each pass for embodiments 1–3 is typically half the fraction of color pixels printed on each pass. In embodiments 4 and 5, the black is printed on alternate passes with a fraction $2/2=1$ times the fraction of color pixels printed on each pass.

Similarly, embodiments 6–10 are most appropriate if the total number of black nozzles is approximately three times as many as the number of nozzles in each color section. For example, in embodiments 6–10 the fraction of black pixels printed on each pass for embodiments 6–8 is typically one third the fraction of color pixels printed on each pass. In embodiments 9 and 10, the black is printed on alternate passes with a fraction of $2/3$ times the fraction of color pixels printed on each pass.

Embodiments 11–15 are most appropriate if the total number of black nozzles is approximately four times as many as the number of nozzles in each color section. This last set of embodiments can produce the lowest inter-color bleeding because no nearest neighbor pixels are printed in each black pass. For example, in embodiments 11–15, four times as many black jets are needed as single color jets. The fraction of black pixels printed on each pass for embodiments 11–13 is typically one fourth the fraction of color pixels printed on each pass. In embodiments 14 and 15, the black is printed on alternate passes with a fraction of $2/4$ times the fraction of color pixels printed on each pass.

In a higher quality mode, colors are printed in more than one pass. For example, embodiment 7 is a higher quality mode relative to embodiment 6 described above. In embodiment 7, each color has two masks that compliment each other to make up a complete image and the black has six masks that compliment each other to make up a complete image.

Furthermore, the receiving media advance length decreases as the number of color passes increase. For example, in embodiment 6, the receiving media advances one color section after each pass. In embodiment 7, the receiving media advances one half a color section after each pass. In embodiment 8, the receiving media advances one fourth color section after each pass.

FIG. 5 is a flowchart outlining one exemplary embodiment of a method for printing with reduced inter-color bleeding according to this invention. Beginning in step 500, one proceeds to step 502, where a print head is monitored. In step 504, a determination is made whether, for any of the swaths being printed by the print head, a portion of the monitored print head will need to print black ink in one of those swaths. If a portion of the print head is printing black ink, control then proceeds to step 506. Otherwise, control returns to step 502.

In step 506, a mask pattern is selected to be used to print a portion of the total black ink required by the desired image for the swaths currently being printed by the black print head. The portion of the black print head selected to eject ink for these swaths is a portion of the total ink to be ejected for these swaths. Additionally, the mask pattern can be sequentially selected from a group of complementary mask patterns. In this case, as described above, sequential passes of the black print head using the sequential mask patterns will results in all of the necessary black ink being ejected onto each of the swaths. Control then proceeds to step 508.

In step 508, black ink is ejected onto a recording medium in accordance with the selected mask pattern. As described above, the mask pattern is only a portion of the total ink necessary to complete each swath. After completing step 508, control returns to step 502, where the process is repeated until the image is complete.

As shown in FIG. 1, in various exemplary embodiments, the print controller 100 can be implemented using an application specific integrated circuit (ASIC). However, the print controller 100 can also be implemented using any other known or later developed integrated circuit, such as a micro-processor, a micro-controller, a digital signal processor, a hardwired electronic or logic circuit such as a discrete element circuit, a programmable logic device such as a PLD, PLA, FPGA or PAL, or the like. In general, any integrated circuit or logic device capable of implementing a finite state machine that is in turn capable of implementing the flowchart shown in FIG. 5, or that is capable of operating the black and color print heads 200 and 250 as outlined with respect to FIGS. 3 and 4, can be used to implement the print controller 100.

While the systems and methods of this invention have been described in conjunction with the specific embodiments outlined above, it is evident that many alternatives, modifications and variations will be apparent to the those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method for reducing inter-color bleeding in an image produced by an inkjet printer, the method comprising:

for each of a plurality of portions of the image, ejecting black ink and at least one color ink to form a portion of the image on a recording medium in at least two passes of a print head; and ejecting partial portions of a total amount of black ink required to form the portion during at least two different passes of the print head of the at least two passes required to form the portion.

2. The method according to claim 1, wherein the print head includes a color print head and a black print head, the black print head being offset from the color print head along a printing direction, so that a first portion of the black print head extends behind the color print head in the printing direction and a first portion of the color print head extends ahead of the black print head.

3. The method according to claim 2, wherein the color print head includes a plurality of color sections, each color section ejecting a different color ink, the first portion of the color print head forming one color section.

4. The method according to claim 3, further comprising:

including in the color print head at least a yellow color section, a cyan color section and a magenta color section.

5. The method according to claim 3, wherein the black print head includes a corresponding plurality of black sections (which may be virtual or physical, contiguous or separated) relative to the plurality of color sections, each black section ejecting black ink, the first portion of the black print head forming one black section.

6. The method according to claim 5, wherein each black section ejects only a portion of the total black ink required to form a portion of the image during a single pass.

7. The method according to claim 6, wherein the portion of ink ejected from each black section includes ejecting approximately one-third of a total amount of ink onto a swath.

8. The method according to claim 2, wherein the color print head includes three color sections, the method further comprises:

dividing the black print head into three sections corresponding to the three color sections.

9. The method according to claim 8, further comprises:

including in the three color sections a yellow color section, a magenta color section and a cyan color section.

10. A device for reducing inter-color bleeding in an image produced by an inkjet printer, the method comprising:

a print head; and a print head controller coupled with the print head, that, for each of a plurality of portions of the image, the print head configured to eject black ink and at least one color ink to form a portion of the image on a recording medium in at least two passes of the print head, and the print head configured to eject partial portions of a total amount of black ink required to form the portion during at least two different passes of the print head of the at least two passes required to form the portion.

11. The device according to claim 10, wherein the print head includes a color print head and a black print head, the black print head being offset from the color print head along a printing direction, so that a first portion of the black print head extends behind the color print head in the printing direction and a first portion of the color print head extends ahead of the black print head.

12. The device according to claim 11, wherein the color print head includes a plurality of color sections, each color section ejecting a different color ink, the first portion of the color print head forming one color section.

13. The device according to claim 12, wherein the color print head includes at least a yellow color section, a cyan color section and a magenta color section.

14. The device according to claim 12, wherein the black print head includes a corresponding plurality of black sections relative to the plurality of color sections, each black section ejecting black ink, the first portion of the black print head forming one black section.

15. The device according to claim 14, wherein the print head controller is configured to instruct each black section to eject only a portion of the total black ink required to form a portion of the image during a single pass.

16. The device according to claim 15, wherein the portion of ink ejected from each black section is approximately one-third of a total amount of ink to be ejected onto a swath.

17. The device according to claim 11, wherein the color print head includes three color sections and the black print head is divided into three sections corresponding to the three color sections.

18. The device according to claim 17, wherein the three color sections include a yellow color section, a magenta color section and a cyan color section.

19. The method according to claim 1, wherein a single print head ejects both the black ink and at least one color ink onto the recording medium.

20. The method according to claim 1, wherein a number of black ink ejector nozzles is twice the number of color ink ejector nozzles.

21. The method according to claim 1, wherein a number of black ink ejecting nozzles is three times the number of color ink ejecting nozzles.

22. The method according to claim 1, wherein the number of black ink ejecting nozzles is four times the number of color ink ejecting nozzles.

* * * * *